United States Patent
Liu

(10) Patent No.: US 10,551,076 B2
(45) Date of Patent: Feb. 4, 2020

(54) MOBILE TYPE COLD AND HOT INTEGRATED APPARATUS

(71) Applicant: Shandong Rongan Electronic Science and Technology Co., Ltd., Qingdao, Shandong (CN)

(72) Inventor: Jialou Liu, Shandong (CN)

(73) Assignee: Shandong Rongan Electronic Science and Technology Co., Ltd., Qingdao, Shandong (CN)

( * ) Notice: Subject to any disclaimer, the term of this patent is extended or adjusted under 35 U.S.C. 154(b) by 199 days.

(21) Appl. No.: 15/871,532

(22) Filed: Jan. 15, 2018

(65) Prior Publication Data

US 2019/0212019 A1 Jul. 11, 2019

(30) Foreign Application Priority Data

Jan. 11, 2018 (CN) .......................... 2018 1 0025698

(51) Int. Cl.
*F24F 1/022* (2019.01)
*F24F 1/04* (2011.01)
*F25B 29/00* (2006.01)

(52) U.S. Cl.
CPC ................ *F24F 1/022* (2013.01); *F24F 1/04* (2013.01); *F25B 29/003* (2013.01); *F25B 2339/047* (2013.01)

(58) Field of Classification Search
CPC .......... F24F 1/022; F24F 1/04; F24F 17/0089; F24F 2221/34; F25B 29/003;

(Continued)

(56) References Cited

U.S. PATENT DOCUMENTS 8,033,479 B2 * 10/2011 Kates ................. G05D 23/1934
  236/1 B
9,759,434 B2 * 9/2017 Pine ......................... F17D 1/00
(Continued)

*Primary Examiner* — Kun Kai Ma
(74) *Attorney, Agent, or Firm* — Houtteman Law LLC

(57) ABSTRACT

The present invention relates to the field of refrigeration and heating technologies, and in particular to a mobile type cold and hot integrated apparatus realized by a compressor, a thick film heater and a water circulation way in a single sealed space without heat exchange of an outdoor machine. The apparatus comprises a shell body, as well as a water circulation cooling compressor refrigeration system and a water circulation thick film heating pipe heating system which are provided in the shell body; wherein the water circulation cooling compressor refrigeration system comprises a refrigeration heat-dissipation module, a water pump A, a water tank, a compressor and a heat-dissipation water tank, the water circulation thick film heating pipe heating system comprises a thick film heating pipe, as well as the water tank and the refrigeration heat-dissipation module which are shared with the water circulation cooling compressor refrigeration system. The apparatus of the present invention has the advantages of good refrigeration heating effect, integrated heat and coldness, customized volume, no need of installation of an outdoor machine, environmental protection and energy saving, plug and play and movable functions, no influence on the environment, comfort for a human body, small energy consumption, and indoor heat storage for life use.

5 Claims, 1 Drawing Sheet

(58) Field of Classification Search
CPC ........ F25B 2339/047; F24H 1/04; F24H 1/06;
F24H 4/04; F24H 6/00; F24H 3/004;
F24D 17/02; F24D 17/0089
See application file for complete search history.

(56) References Cited

U.S. PATENT DOCUMENTS

| | | | |
|---|---|---|---|
| 10,131,828 B2 * | 11/2018 | Okamoto | C09K 5/045 |
| 2011/0115223 A1 * | 5/2011 | Stahlkopf | F01K 13/02 |
| | | | 290/7 |
| 2013/0305747 A1 * | 11/2013 | Krische | F25B 30/00 |
| | | | 62/79 |
| 2015/0241085 A1 * | 8/2015 | Justus | F24H 9/148 |
| | | | 290/2 |
| 2016/0273802 A1 * | 9/2016 | Roetker | F25B 17/02 |
| 2018/0369713 A1 * | 12/2018 | Dorfman | C02F 9/005 |
| 2019/0093912 A1 * | 3/2019 | Liu | F24F 11/0008 |

* cited by examiner

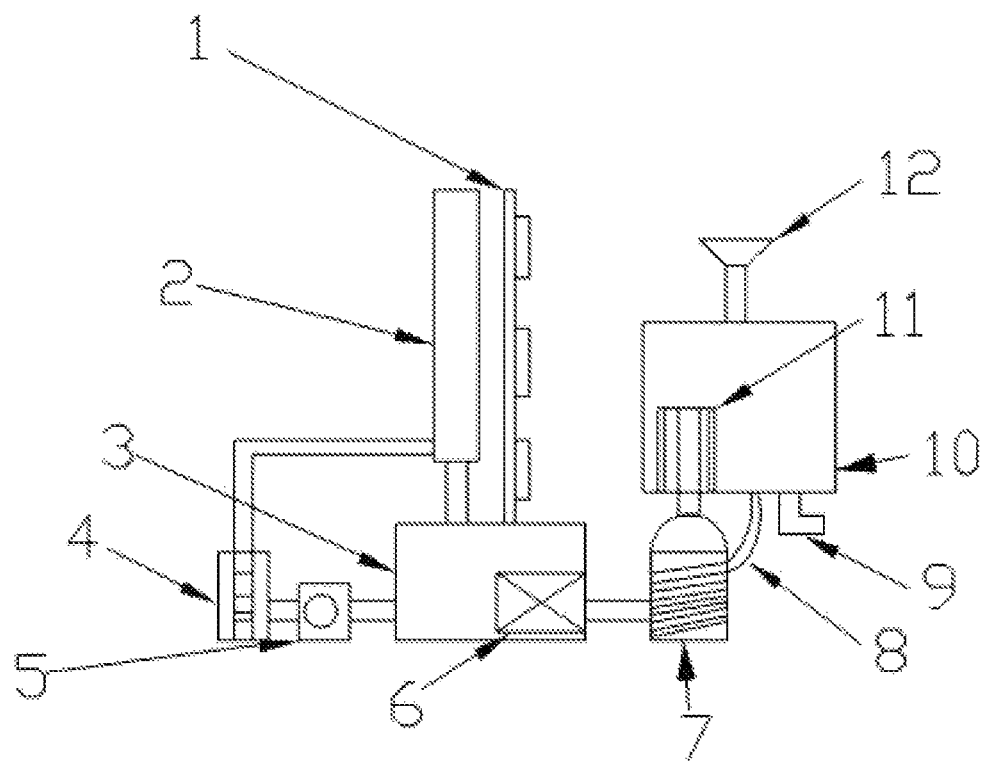

MOBILE TYPE COLD AND HOT INTEGRATED APPARATUS

TECHNICAL FIELD OF THE INVENTION

The present invention relates to the field of refrigeration and heating technologies, and in particular to a mobile type cold and hot integrated apparatus realized by a compressor, a thick film heater and a water circulation way in a single sealed space without heat exchange of an outdoor machine.

TECHNICAL BACKGROUND OF THE INVENTION

At present, a commonly used refrigeration and heating apparatus in a market is mainly various forms of air conditioners. An air-conditioning apparatus currently widely uses a refrigeration mode that an outdoor machine exchanges heat in two separate spaces, this may of course guarantee an indoor temperature effect, However, the heat generated and discharged during a refrigeration process may not be collected and utilized and may only be discharged to an external environment, resulting in environmental pollution and waste of resources. Moreover, the heat discharged by the air conditioner greatly disrupts the overall environment, increasing the heat island effect in a city and damaging an air structure. Especially in summer, when the temperatures in the city remains high, the heat discharged by the outdoor machine of the air-conditioner is one of culprits. Meanwhile, the outdoor machine destroys the integrity of an exterior wall of a building, affecting the appearance of the city, and having some potential safety hazard. In the process of installing the air conditioner, a user has to also spend a lot of energy dedicated to the design of an air conditioning well and a pipeline, the perennial use of these pipelines will make harmful bacteria breed inside, causing a great hazard to a human body. The maintenance and the replacement of air-conditioning pipe are also a time-consuming and labor-intensive project. In addition, the outdoor machine is accompanied by a huge noise while being in operation, resulting in noise pollution.

In terms of indoor heating, the air conditioner has big power consumption, needs more electricity and hence is not commonly used, more people tend to use a central heating mode with a heating radiator. The use of the ordinary heating radiator is more extensive, and the heat loss of the ordinary heating radiator during the heating is relative large, moreover, the heating radiator is fixedly provided, which is not easy to be cleaned and replaced.

SUMMARY OF THE PRESENT INVENTION

In order to solve the problems in the prior art, the invention provides a mobile type cold and hot integrated apparatus which is refrigerated by a compressor, is heated by a thick film heating pipe, does not have an outdoor machine, is mobile, does not have heat discharged outdoor, may reuse redundant heat, is cooled via water circulation indoor, is warmed via air circulation heat convection indoor, and is plug and play.

The present invention has the following technical solution:

A mobile type cold and hot integrated apparatus comprises a shell body, as well as a water circulation cooling compressor refrigeration system and a water circulation thick film heating pipe heating system which are provided in the shell body; wherein the water circulation cooling compressor refrigeration system comprises a refrigeration heat-dissipation module, a water pump A, a water tank, a compressor and a heat-dissipation water tank, the refrigeration heat-dissipation module comprises a surface air cooler and a fan provided at one side of the surface air cooler, the surface air cooler and the fan are fixed at an upper end of the water tank, the surface air cooler is connected with the water tank via the water pump A; the compressor comprises a compressor body, as well as a conduction cold piece and a heat-dissipation piece which are connected with the compressor body, the conduction cold piece is provided in the water tank, the heat-dissipation piece is provided in the heat-dissipation water tank; the water circulation thick film heating pipe heating system comprises a thick film heating pipe, as well as the water tank and the refrigeration heat-dissipation module which are shared with the water circulation cooling compressor refrigeration system, the thick film heating pipe is provided between the surface air cooler and the water pump A and connected with the surface air cooler and the water pump A via a pipeline.

Furthermore, the surface air cooler is provided thereon with a water inlet pipe and a water outlet pipe, the surface air cooler is communicated with the water tank via the water outlet pipe, the surface air cooler is connected with the thick film heating pipe via the water inlet pipe.

furthermore, a compressor heat collection pipe is wound on the compressor, the compressor heat collection pipe is communicated with a heat-dissipation water tank via a water pump B.

Furthermore, an upper end of the heat-dissipation water tank is provided with a water inlet, the water inlet is provided thereon with a water purification device, a lower end of the heat-dissipation water tank is provided with a water outlet.

Furthermore, the water outlet is provided thereon with an instantly heating device and a temperature controller connected with the instantly heating device.

Furthermore, the thick film heating pipe comprises a stainless steel substrate, an inner insulating medium layer, a resistance heating layer and an outer insulating medium layer from the inside to the outside, the stainless steel substrate is provided as a two-layer structure consisting of an inner layer and an outer layer which are provided with a vacuum cavity therebetween.

Furthermore, a thermal insulation layer is provided on the water tank and the heat-dissipation water tank.

Furthermore, the material of the conduction cold piece is copper or aluminum.

The invention has the following advantageous effects:

The apparatus of the present invention has the advantages of good refrigeration heating effect, integrated heat and coldness, customized volume, no need of installation of an outdoor machine, environmental protection and energy saving, plug and play and movable functions, no influence on the environment, comfort for a human body, small energy consumption, and indoor heat storage for life use.

BRIEF DESCRIPTION OF THE DRAWINGS

FIGURE is a structure diagram of an inner portion of the invention.

1: Fan; 2: Surface Air Cooler; 3: Water Tank; 4: Thick Film Heating Pipe; 5: Water Pump A; 6: Conduction Cold Piece; 7: Compressor 8 Condenser Heat Collection Pipe; 9:

Water Outlet; 10: Heat-Dissipation Water Tank; 11, Heat-Dissipation Piece; 12, Water Purification Device.

EMBODIMENTS OF THE PRESENT INVENTION

Hereinafter, the present invention will be described in more detail with reference to the accompanying drawings, but the present invention is not limited thereto.

As shown in FIG. 1, a mobile type cold and hot integrated apparatus comprises a shell body, as well as a water circulation cooling compressor refrigeration system and a water circulation thick film heating pipe heating system which are provided in the shell body. The water circulation cooling compressor refrigeration system comprises a refrigeration heat-dissipation module, a water pump A5, a water tank 3, a compressor 7 and a heat-dissipation water tank 10. The refrigeration heat-dissipation module comprises a surface air cooler 2 and a fan 1 provided at one side of the surface air cooler 2, the surface air cooler 2 and the fan 1 are fixed at an upper end of the water tank 3, the surface air cooler 2 is connected with the water tank 3 via the water pump A5. The surface air cooler 2 is connected with the water tank 3 via the water pump A5 and forms a circulation, when the refrigeration system is in operation, the heat in the water of the water tank 3 is taken away by a system of the compressor 7, and transmitted to and circulated in the surface air cooler 2 via the water pump A5 in the water tank 3, a refrigeration module exchanges heat with an indoor environment to absorb the heat of indoor air and reduce the temperature of the air to achieve an refrigeration effect; meanwhile, wind is transmitted by a fan blade to make the indoor air circulated, therefore, the indoor temperature may be evenly lowered, thus completing indoor cooling.

The compressor 7 comprises a compressor body, as well as a conduction cold piece 6 and a heat-dissipation piece 11 which are connected with the compressor body, the conduction cold piece 6 is provided in the water tank 3 and under water surface. the heat-dissipation piece 11 is provided in the heat-dissipation water tank 10 and under the water surface. a compressor heat collection pipe 8 is wound on the compressor 7, the compressor heat collection pipe 8 is communicated with the heat-dissipation water tank 10 via a water pump B. Since the compressor heat collection pipe 8 is wound outside the compressor 7, the heat generated during the operation of the compressor 7 is transmitted to the heat-dissipation water tank 10.

An upper end of the heat-dissipation water tank 10 is provided with a water inlet, the water inlet is provided thereon with a water purification device 12, an external water source, through filtering, adsorption, reverse osmosis and other filtering methods, makes the level of purified water be a directly drinking water level. A lower end of the heat-dissipation water tank 10 is provided with a water outlet 9, the water outlet 9 is provided thereon with an instantly heating device and a temperature controller connected with the instantly heating device. A user may freely set the temperature of the water through the temperature controller for domestic water use.

The water circulation thick film heating pipe heating system comprises a thick film heating pipe 4, as well as the water tank 3 and the refrigeration heat-dissipation module which are shared with the water circulation cooling compressor refrigeration system. the thick film heating pipe 4 comprises a stainless steel substrate, an inner insulating medium layer, a resistance heating layer and an outer insulating medium layer from the inside to the outside, the stainless steel substrate is provided as a two-layer structure consisting of an inner layer and an outer layer which are provided with a vacuum cavity therebetween. The present invention has a certain role in insulation, and may reduce heating time to a certain extent, speed up heating efficiency and reduce user's fees. Thick film heating belongs to surface heating and hence has even overall heating, as the heat may be conducted in time, the whole surface of the thick film heating pipe does not have high temperature and will not cause open flame, thus having good safety and a long service life.

The thick film heating pipe 4 is provided between the surface air cooler 2 and the water pump A5 and connected with the surface air cooler 2 and the water pump A5 via a pipeline. Specifically, a water inlet pipe and a water outlet pipe are provided on the surface air cooler 2, the surface air cooler 2 is communicated with the water tank 3 via the water outlet pipe, the surface air cooler 2 is connected with the thick film heating pipe 4 via the water inlet pipe. When the heating system works, the water under normal temperature in the water tank 3 is transferred via the water pump A5, is heated via the thick film heating pipe 4 and then enters the surface air cooler 2 to be circulated, the heat is dissipated into the air via the refrigeration heating module to achieve indoor air heating effect, the indoor air circulation is promoted with the drive of the fan 1, thus improving the indoor heating effect.

The water circulation cooling compressor refrigeration system and the water circulation thick film heating system operate separately and independently, when the refrigeration system works, the thick film heating pipe 4 is not heated and may be passed through water without affecting the water circulation inside the refrigeration system. When the heating system runs, the water tank 3, the refrigeration and cooling module and the thick film heating pipe 4 enter working state and realize the internal water circulation.

To ensure safety and ensure that the collected heat is not dissipated into the environment, a thermal insulation layer is provided on the water tank 3 and the heat-dissipation water tank 10.

To improve conduction cold efficiency, the material of the conduction cold piece 3 is copper or aluminum.

The principle of the present invention is as follows:

The refrigeration compressor converts a refrigerant from low pressure to high pressure, the refrigerant continues to be circulated in the compressor, the heat-dissipation piece and the conduction cold piece and transforms the forms thereof, the refrigerant implements form change from liquid to gas in the conduction cold piece, absorbs heat and hence takes away the heat in the water tank. When the refrigerant is changed from the gas to the liquid in the heat-dissipation piece, the heat is dissipated into the heat-dissipation water tank, therefore, the system continuously discharges the absorbed heat into the heat-dissipation water tank. the refrigeration compressor is the heart of the refrigeration system, the refrigeration system inputs electric energy through the compressor, and adjusts pressure to drive the form change of the refrigerant and thus discharge the heat continuously from the water tank to the heat-dissipation tank. The conduction cold piece of the compressor implements heat exchange with the water in the water tank, absorbs the heat in the water tank and makes the temperature of the water in the water tank reduced, the heat discharged when the compressor compresses the refrigerant is absorbed in the water in the heat-dissipation water tank via the heat-dissipation piece of the compressor, water has very large specific heat capacity and good thermal conductivity and hence may store a lot of heat, therefore, if the temperature goes up relatively high, the system may still operate stably, so as not to affect the water refrigeration effect in the water tank. This set of the refrigeration system is featured with no externally discharged heat, which ensures non-destruction for the environment, since the refrigeration system collects and utilizes the generated heat, the energy consumption is lowered.

The thick film heating pipe is a stainless steel thick film heating pipe, when the heating system operates, the water under the normal temperature in the water tank passes through the thick film heating pipe under the action of the water pump, and is heated by the thick film heating pipe, the thick film heating pipe is a type of a rapid heating heater, the heated water enters the surface air cooler and exchanges heat with the air via the surface air cooler to reach the heating effect of the indoor air, the cool water of which heat is exchanged flows back to the water tank and hence forms inner water circulation.

The compressor and the thick film heating pipe have high reliability, thus improving the service life of the apparatus. the heat generated during the working process of the compressor does not need to be discharged externally and may have secondary use, thus making full use of resources without causing damage to the environment. With the thick film heating pipe, a stainless steel substrate is provided as the two-layer structure consisting of the inner layer and the outer layer which are provided with the vacuum cavity therebetween, thus having a certain degree of thermal insulation, being able to reduce heating time to a certain extent, speeding up heating efficiency, and reducing the user's fees. The thick film heating pipe has a small volume and a groove design facilitating the cleaning of scale, thus having strong safety and long service life. The above embodiments of the present invention are not intended to limit the protection scope of the present invention. Any modification, equivalent replacement and improvement made within the spirit and principle of the present invention should be included in the protection scope of the claims of the present invention.

What is claimed is:

1. A mobile type cold and hot integrated apparatus, being characterized by comprising a shell body, as well as a water circulation cooling compressor refrigeration system and a water circulation thick film heating pipe heating system which are provided in the shell body; wherein the water circulation cooling compressor refrigeration system comprises a refrigeration heat-dissipation module, a water pump A, a water tank, a compressor and a heat-dissipation water tank, the refrigeration heat-dissipation module comprises a surface air cooler and a fan provided at one side of the surface air cooler, the surface air cooler and the fan are fixed at an upper end of the water tank, the surface air cooler is connected with the water tank via the water pump A; the compressor comprises a compressor body, as well as a conduction cold piece and a heat-dissipation piece which are connected with the compressor body, the conduction cold piece is provided in the water tank, the heat-dissipation piece is provided in the heat-dissipation water tank; the water circulation thick film heating pipe heating system comprises a thick film heating pipe, as well as the water tank and the refrigeration heat-dissipation module which are shared with the water circulation cooling compressor refrigeration system, the thick film heating pipe is provided between the surface air cooler and the water pump A and connected with the surface air cooler and the water pump A via a pipeline.

2. The mobile type cold and hot integrated apparatus according to claim 1, characterized in that the surface air cooler is provided thereon with a water inlet pipe and a water outlet pipe, the surface air cooler is communicated with the water tank via the water outlet pipe, the surface air cooler is connected with the thick film heating pipe via the water inlet pipe.

3. The mobile type cold and hot integrated apparatus according to claim 1, characterized in that a compressor heat collection pipe is wound on the compressor, the compressor heat collection pipe is communicated with a heat-dissipation water tank via a water pump B.

4. The mobile type cold and hot integrated apparatus according to claim 1, characterized in that an upper end of the heat-dissipation water tank is provided with a water inlet, the water inlet is provided thereon with a water purification device, a lower end of the heat-dissipation water tank is provided with a water outlet, the water outlet is provided thereon with an instantly heating device and a temperature controller connected with the instantly heating device.

5. The mobile type cold and hot integrated apparatus according to claim 1, characterized in that the thick film heating pipe comprises a stainless steel substrate, an inner insulating medium layer, a resistance heating layer and an outer insulating medium layer from the inside to the outside, the stainless steel substrate is provided as a two-layer structure consisting of an inner layer and an outer layer which are provided with a vacuum cavity therebetween.

* * * * *